United States Patent
Shimizu

(10) Patent No.: US 7,880,822 B2
(45) Date of Patent: Feb. 1, 2011

(54) LIQUID CRYSTAL DISPLAY PANEL AND LIQUID CRYSTAL DISPLAY DEVICE

(75) Inventor: Masahiro Shimizu, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 176 days.

(21) Appl. No.: 12/278,212

(22) PCT Filed: Sep. 21, 2006

(86) PCT No.: PCT/JP2006/318689

§ 371 (c)(1),
(2), (4) Date: Aug. 4, 2008

(87) PCT Pub. No.: WO2007/091346

PCT Pub. Date: Aug. 16, 2007

(65) Prior Publication Data

US 2009/0051841 A1    Feb. 26, 2009

(30) Foreign Application Priority Data

Feb. 10, 2006   (JP) ............................. 2006-034456

(51) Int. Cl.
*G02F 1/1343* (2006.01)
(52) U.S. Cl. .......................................... 349/38; 349/39
(58) Field of Classification Search ................... 349/38, 349/39
See application file for complete search history.

(56) References Cited

U.S. PATENT DOCUMENTS

| | | | |
|---|---|---|---|
| 5,805,252 A * | 9/1998 | Shimada et al. | 349/113 |
| 5,831,708 A * | 11/1998 | Hiraishi et al. | 349/143 |
| 5,877,830 A * | 3/1999 | Shimada et al. | 349/110 |
| 5,986,738 A * | 11/1999 | Tagusa et al. | 349/138 |
| 6,034,747 A * | 3/2000 | Tanaka et al. | 349/43 |
| 6,084,653 A * | 7/2000 | Shimada et al. | 349/187 |
| 6,147,722 A * | 11/2000 | Shimada et al. | 349/43 |
| 6,172,728 B1 * | 1/2001 | Hiraishi | 349/139 |
| 6,188,458 B1 * | 2/2001 | Tagusa et al. | 349/138 |
| 6,195,140 B1 * | 2/2001 | Kubo et al. | 349/44 |
| 6,268,895 B1 * | 7/2001 | Shimada et al. | 349/110 |
| 6,330,047 B1 * | 12/2001 | Kubo et al. | 349/147 |
| 6,452,654 B2 * | 9/2002 | Kubo et al. | 349/114 |

(Continued)

FOREIGN PATENT DOCUMENTS

JP         10-020284         *      1/1998

(Continued)

OTHER PUBLICATIONS

International Search Report for PCT/JP2006/318689 mailed Oct. 31, 2006.*

*Primary Examiner*—K. Cyrus Kianni
(74) *Attorney, Agent, or Firm*—Nixon & Vanderhye PC

(57) ABSTRACT

A pixel electrode (33), a gate bus line (31), and a source bus line (32) are formed while interposing an interlayer insulating film (35) therebetween. When viewed from the display surface side of a liquid crystal display panel, the pixel electrode (33), the gate bus line (31) and the source bus line (32) are arranged to overlap at least partially in the plan view. Consequently, in a liquid crystal display to which an OCB mode is applied, a uniform bend orientation can be attained over the entire screen even if transition nuclei are not generated in all pixels.

6 Claims, 9 Drawing Sheets

A—A

U.S. PATENT DOCUMENTS

| | | | |
|---|---|---|---|
| 6,515,725 B1 * | 2/2003 | Hattori et al. | |
| 6,603,524 B1 * | 8/2003 | Shimada et al. | 349/139 |
| 2001/0002857 A1 * | 6/2001 | Shimada et al. | 349/138 |
| 2001/0020991 A1 * | 9/2001 | Kubo et al. | 349/113 |
| 2002/0085154 A1 * | 7/2002 | Hattori et al. | |
| 2002/0105613 A1 * | 8/2002 | Yamakita et al. | |
| 2002/0145579 A1 * | 10/2002 | Yamakita et al. | |
| 2002/0149551 A1 * | 10/2002 | Yamakita et al. | |
| 2002/0171792 A1 * | 11/2002 | Kubota et al. | 349/114 |
| 2003/0011555 A1 * | 1/2003 | Fukami et al. | |
| 2003/0122767 A1 * | 7/2003 | Nakao et al. | |
| 2004/0080698 A1 * | 4/2004 | Hattori et al. | |
| 2005/0117108 A1 * | 6/2005 | Kume et al. | 349/156 |
| 2005/0140916 A1 * | 6/2005 | Kume et al. | 349/156 |
| 2006/0114396 A1 * | 6/2006 | Choi | 349/139 |
| 2009/0256983 A1 * | 10/2009 | Gu et al. | 349/42 |

FOREIGN PATENT DOCUMENTS

| | | | |
|---|---|---|---|
| JP | 2002-98974 | * | 4/2002 |
| JP | 2002-202494 | * | 7/2002 |
| JP | 2003-107531 | * | 4/2003 |
| JP | 2003-280036 | * | 10/2003 |

* cited by examiner

A—A

B—B

B—B

LIQUID CRYSTAL DISPLAY PANEL AND LIQUID CRYSTAL DISPLAY DEVICE

This application is the U.S. national phase of International Application No. PCT/JP2006/318689 filed 21 Sep. 2006 which designated the U.S. and claims priority to Japanese Application No. 2006-034456 filed 10 Feb. 2006, the entire contents of each of which are hereby incorporated by reference.

TECHNICAL FIELD

The present invention relates to a liquid crystal display panel and a liquid crystal display device, to each of which OCB (Optically self-Compensated Birefringence) mode is applied.

BACKGROUND ART

Various color liquid crystal displays are conventionally used as color display devices having characteristics such as a flat shape and lightweight. As a liquid-crystal technology has been developed in recent years, a color liquid crystal device having a high contrast and a wide viewing angle characteristic has been developed and widely put to practical use as a mainstream of a large-size display.

Such color liquid crystal display devices that are widely used these days adopt, for example, (i) a twisted nematic mode (hereinafter referred to as a "TN mode") in which an optical rotation of a liquid crystal layer is controlled by an electrical field so that a display is carried out, (ii) a birefringence mode (hereinafter referred to as an "ECB mode") in which a birefringence of a liquid crystal layer is controlled by an electrical field so that a display is carried out, or the like mode.

However, there is a problem in which the color liquid crystal display device that uses these modes is not suitable for displaying moving image because an image lag phenomenon occurs or an outline of image is blurred due to a slow response speed.

In order to solve such a problem, many experiments for fastening a response speed of the color liquid crystal display have been conventionally carried out. Currently, a ferroelectric liquid crystal mode, an antiferroelectric liquid crystal mode, an OCB mode, or the like has been used as a liquid crystal mode having a fast response speed that is suitable for moving image display.

There has been known that, in these modes, the ferroelectric liquid crystal mode and the antiferroelectric liquid crystal mode have a lot of problems for practical uses because they have a low impact resistance due to a layered structure.

On the other hand, the OCB mode has been focused as a liquid crystal mode suitable for moving image display because the OCB mode that uses a usual nematic crystal (i) has a strong impact resistance, (ii) is available in a wide temperature range, and (iii) has a wide viewing angel and a fast response characteristic.

FIG. 14 schematically illustrates the OCB mode. In a liquid crystal display device to which the OCB mode is applied, a pair of transparent glass substrates 10 and 11 sandwich a liquid crystal layer 12 therebetween, and transparent electrodes 13 and 14 are respectively provided on the glass substrates 10 and 11 on a side of the liquid crystal layer 12, and alignment films 15 and 16 are respectively provided thereon. An alignment process is performed for the liquid crystal layer 12 by rubbing.

In a case where a color display is carried out in the liquid crystal display device, a color filter is provided on one of the glass substrates. In order that a liquid crystal is driven by active matrix, a gate bus line and a source bus line are provided on the other one of the glass substrates, and a TFT is provided at an intersection thereof. After the substrates are respectively provided, the substrates are bonded via a spherical spacer or a column spacer so that an arbitral gap is provided therebetween. A liquid crystal is injected in vacuum between the bonded substrates, or injected by a dropping method between the substrates when the glass substrates are bonded. In order that a viewing angle characteristic of display is improved, a wave plate (not illustrated) is bonded to either side or both sides of a liquid crystal cell, and a polarization plate (not illustrated) is externally bonded thereto.

The liquid crystal layer 12 that is right after the liquid crystal is injected is often aligned as illustrated in FIG. 15, which is called an initial alignment (splay alignment). When an intended voltage is applied to the electrodes 13 and 14 that are respectively provided above and below the liquid crystal layer 12, an alignment transition occurs in the liquid crystal layer 12 and the alignment is gradually changed to an alignment (bend alignment) illustrated in FIG. 14. When the liquid crystal layer 12 becomes the bend alignment as illustrated in FIG. 14, an alignment change of the liquid crystal makes a response rapidly. This allows the fastest display in modes that use nematic crystal. Furthermore, when a wave plate is provided in the liquid crystal display device, it is possible to realize a display state having a wide viewing angle characteristic.

As such, in the OCB mode, an alignment of a liquid crystal layer is a splay alignment while no voltage is applied, and a display is carried out in a state where the alignment of the liquid crystal layer is in a bend alignment. Consequently, in a liquid crystal display device to which the OCB mode is applied, when a display is carried out, a voltage is continuously applied to a liquid crystal layer so that the bend alignment is maintained. For example, as illustrated in FIGS. 16 and 17, in a case where (i) a white display is carried out when a voltage $V_L$ is applied, (ii) a black display is carried out when a voltage $V_H$ is applied, and (iii) an intermediate state is displayed when a voltage between $V_L$ and $V_H$ is applied, an alignment of the liquid crystal layer 12 is the bend alignment in a range of voltages $V_L$ through $V_H$.

In the OCB mode, the liquid crystal layer 12 in the display state maintains the bend alignment while a voltage is consistently applied, whereas the alignment of the liquid crystal layer 12 is the splay alignment while a power of the liquid crystal display device is in an OFF state and no voltage is applied. On this account, when the power of the liquid crystal display device is turned on, an alignment transition from the splay alignment to the bend alignment (splay-to-bend transition) occurs in the liquid crystal layer 12.

However, it is known that the splay-to-bend transition requires a high voltage or a long time. It depends on a voltage applied to a liquid crystal layer how long it takes that the splay-to-bend transition is carried out over a screen. FIG. 18 illustrates how a voltage applied to a liquid crystal layer at room temperature (+25° C.) affects a transition time required for a splay-to-bend transition. In this case, an area of an electrode is 1 square centimeter (scm), and a cell thickness is 5 μm. As illustrated in FIG. 18, it is shown that, as the voltage applied to a liquid crystal layer increases, the splay-to-bend transition takes a shorter time.

Meanwhile, from observation of the splay-to-bend transition, it is shown that the transition occurs from a peculiar place where several spacers are nucleated. Such a place is called a transition nucleus. Since merely several transition nuclei may be generated in 1 scm, it takes longer that the splay-to-bend transition spreads over the entire screen. A spreading speed of the splay-to-bend transition depends on viscosity of a liquid crystal. For example, the viscosity of a liquid crystal largely increases at low temperature such as −30° C. In this case, the spreading speed of the splay-to-bend transition becomes ten times slower that that at room temperature.

Furthermore, in a practical TFT liquid crystal display panel, a pixel electrode is provided in a region surrounded by a source bus line and a gate bus line that are intersected with each other (hereinafter, both of a source bus line and a gate bus line are referred to as just bus lines). Generally, a distanced space is provided between the pixel electrode and the bus lines for insulating the pixel electrode from the bus lines.

In the distanced space, a voltage is not sufficiently applied to the liquid crystal layer because there are no pixel electrode and bus lines. This is shown in FIG. 19. FIG. 19 illustrates an electric potential of a liquid crystal layer when a voltage is applied to pixel electrodes, bus lines, and a counter electrode in a TFT liquid crystal display panel in which the pixel electrodes and the bus lines are provided in plane. As apparent from FIG. 19, in distanced spaces between the pixel electrodes and the bus line, a voltage is not applied to the liquid crystal layer.

As such, in a distanced space where no voltage is applied to a liquid crystal layer, even if a splay-to-bend transition occurs in a transition nucleus in a certain pixel electrode, the splay-to-bend transition does not spread into adjoining pixel electrodes over the distanced spaces. From this reason, the splay-to-bend transition thus occurred in a certain pixel electrode does not spread into pixel electrodes having no transition nucleus therein, which causes a problem in which the splay-to-bend transition does not spread over the entire screen.

In order to solve the problem, Patent Document 1 discloses an arrangement in which a convex section or a concave section made of a conductive material is provided at a specified position in a screen. With the arrangement, an electrical field intensity applied to a liquid crystal layer on the convex or concave section becomes larger than a surrounding area, thereby promoting generation of transition nuclei. Thus, the transition nuclei are formed in each pixel, with the result that the splay-to-bend transition is easily carried out in all the pixels.

Patent Document 2 discloses driving means for generating a potential difference between a first electrode (for example, an auxiliary capacitor electrode) and a second electrode (for example, a pixel electrode) that is provided so as to overlap the first electrode via an insulator and has a lacking section. With the arrangement, an electrical field intensity applied to between the two electrodes becomes larger than other regions, thereby resulting in that liquid crystal molecules positioned around the lacking section become transition nuclei. This facilitates a splay-to-bend transition to be carried out in all pixels.

In this way, in Patent Documents 1 and 2, all structures that are to be transition nuclei are provided in all pixels, so that, even if there are distanced spaces in which no voltage is applied to a liquid crystal layer, a splay-to-bend transition occurs in all pixels, i.e., over an entire screen.

[Patent Document 1]
Japanese Unexamined Patent Publication, Tokukaihei, No. 10-20284 (published on Jan. 23, 1998)

[Patent Document 2]
Japanese Unexamined Patent Publication, Tokukai, No. 2003-107506 (published on Apr. 9, 2003)

DISCLOSURE OF INVENTION

However, in the conventional arrangements disclosed in Patent Documents 1 and 2, the splay-to-bend transition may not occur in all pixels in the screen depending on an operation environment or the like of the liquid crystal display. For example, in a case of a low temperature such as −30° C., viscosity of the liquid crystal is too thick, so that the splay-to-bend transition requires a longer time. In this case, enough transition nuclei required for an intended display may not be generated.

In addition, since all pixel electrodes and bus lines are not continuously provided in the TFT liquid crystal display panel due to distanced spaces provided therebetween, a splay-to-bend transition that has occurred from transition nuclei in a certain pixel cannot spread into other pixels. This causes the following problem. That is, in a case where transition nuclei are not generated in all pixels, pixels in which no transition nucleus is generated are not changed to the bend alignment, and remain as bright dots. Such the bright dots are observed as dot defects.

Furthermore, the arrangements of Patent Documents 1 and 2 have a problem in which additional processes for forming a structure to be transition nuclei in a pixel are required in manufacturing the liquid crystal display panel.

The present invention is accomplished in view of the above problems. An object of the present invention is to realize a liquid crystal display device to which an OCB mode is applied, and in which a uniform bend alignment is attained over an entire screen even when transition nuclei are not generated in all pixels.

In order to solve the problems, a liquid crystal display panel of the present invention includes: an active matrix substrate including a pixel electrode, a gate bus line, and a source bus line; and a counter substrate provided so as to face the active matrix substrate via a liquid crystal layer whose alignment is changed from an initial state to an image display state having an alignment different from the initial state, an interlayer insulating film being provided so as to insulate the pixel electrode from the gate bus line and the source bus line, and the pixel electrode being placed such that the pixel electrode, the gate bus line, and the source bus line, at least in part, overlap each other in a planner manner, when viewed from a display surface side of the liquid crystal display panel.

Here, the liquid crystal layer whose alignment is changed from an initial state to an image display state having an alignment different from the initial state encompasses a liquid crystal layer in the OCB mode which is changed from a splay alignment (the initial state) to a bend alignment (the image display state) while a power of the liquid crystal display device is ON. In such a liquid crystal layer, its alignment is changed from the initial state to the image display state when a voltage is applied to the liquid crystal layer. At this time, an alignment transition occurs from transition nuclei and spreads over a screen, with the result that the alignment transition is carried out over the entire screen.

In the arrangement, the interlayer insulating film is provided so as to insulate the pixel electrode from the gate bus line and the source bus line. While maintaining its insulation property, the pixel electrode is provided such that the pixel electrode, the gate bus line, and the source bus line, at least in part, overlap each other in a plane manner, when viewed from the display surface side.

With the arrangement, when the voltage is applied to the liquid crystal layer, a voltage-applied area can be continued between adjoining pixel electrodes in a part where the pixel electrode overlaps the bus lines in a plane manner. As a result, an alignment transition that has occurred in a certain pixel can spread into its adjoining pixels, and also spread into pixels in which no transition nucleus is generated. This allows an entire screen to be changed to the image display state.

BEST MODE FOR CARRYING OUT THE INVENTION

Embodiment 1 of the present invention is described below with reference to FIGS. 1 through 5.

Figure 1:
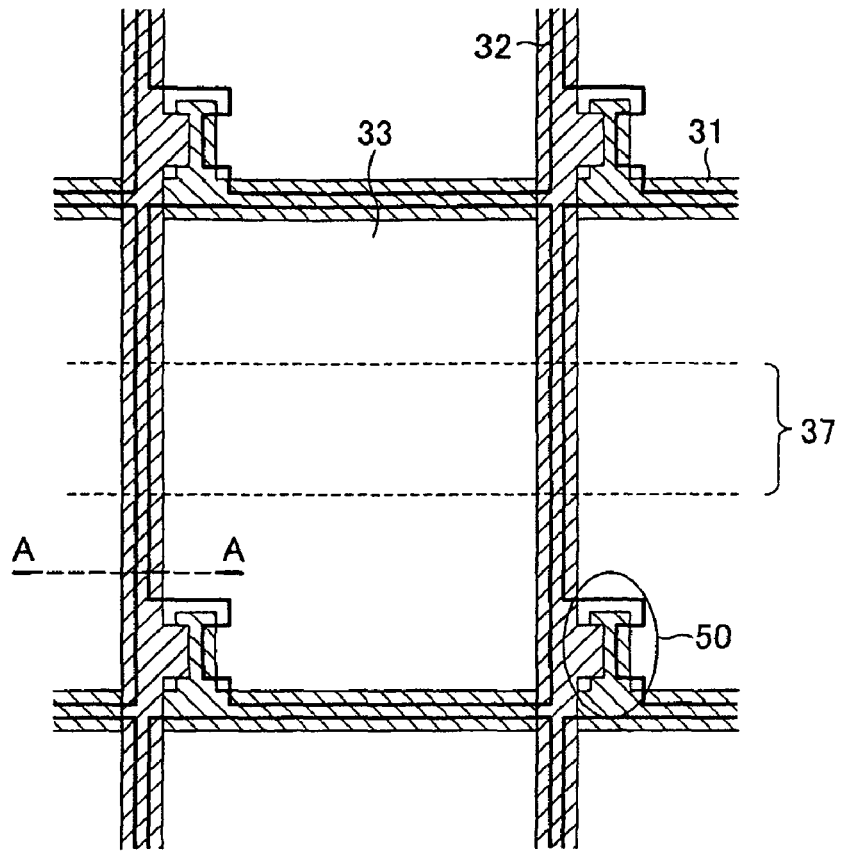
FIG. 1 is a plan view illustrating a pixel arrangement of a liquid crystal display panel in accordance with Embodiment 1 of the present invention.
Figure 2:
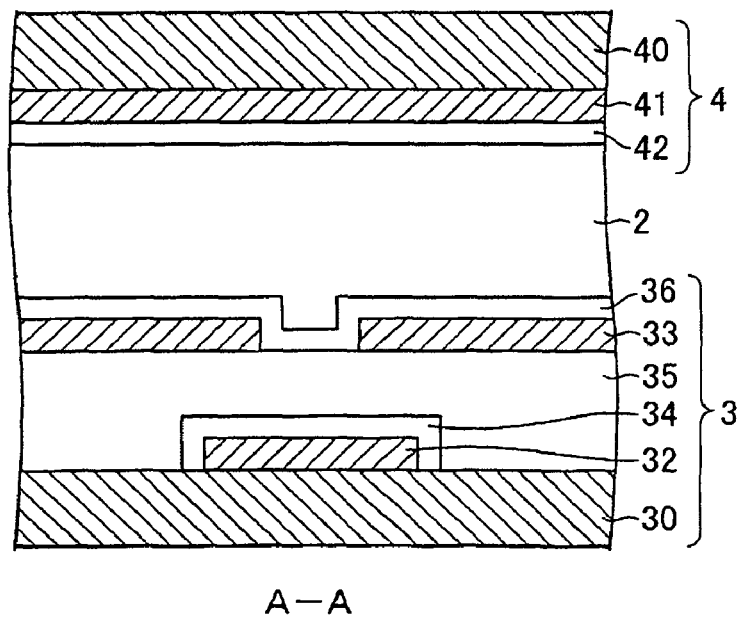
FIG. 2 is a cross sectional view taken along line A-A of FIG. 1.

FIG. 1 is a plan view schematically illustrating a pixel arrangement of a liquid crystal display panel of Embodiment 1. FIG. 2 is a cross sectional view taken along line A-A of FIG. 1.

As illustrated in FIGS. 1 and 2, the liquid crystal display panel is for a TFT liquid crystal display device, in which a liquid crystal layer 2 is sandwiched between an active matrix substrate 3 and a counter substrate 4.

The active matrix substrate 3 is arranged, in a schematic manner, such that a gate bus line 31, a source bus line 32, and a pixel electrode 33 are provided on a substrate (e.g., a glass substrate) 30. In the active matrix substrate, a gate insulating film 34 is provided between the gate bus line 31 and the source bus line 32; an interlayer insulating film 35 is provided so as to insulate the pixel electrode 33 from the gate bus line 31 and the source bus line 32; and an alignment film 36 is provided on the pixel electrode 33. Further, a storage capacitor bus line 37 may be provided in the same layer as the gate bus line 31.

The counter substrate is arranged such that a counter electrode 41 and an alignment film 42 are provided entirely on a substrate (e.g., a glass substrate) 40.

The pixel electrode 33 is connected to the gate bus line 31 and the source bus line 32 via a TFT 50, while the pixel electrode 33 is electrically connected to a drain electrode of the TFT 50 via a contact hole (not illustrated) provided in the interlayer insulating film 35. Moreover, the pixel electrode 33 is provided so as to cover the gate bus line 31 and the source bus line 32 via the interlayer insulating film in a plane manner. That is, as illustrated in FIG. 1, when the liquid crystal display panel is viewed from its display surface side, the pixel electrode 33 is provided so as to overlap the bus lines, and no distanced space is provided between the pixel electrode 33 and the bus lines.

The following explanation deals with a specific example about how to manufacture a liquid crystal display panel having the arrangements of FIGS. 1 and 2. Firstly, an active matrix substrate (TFT array substrate) is formed as follows. A gate bus line 31 and a storage capacitor bus line 37 are provided on a glass substrate 30 that is processed by a base coat and the like. The gate bus line 31 and the storage capacitor bus line 37 are formed in such a manner that a metal film is deposited all over the substrate 30 by sputtering, and the metal film is patterned by a photolithography process. The bus lines thus formed have a laminated structure constituted by Ta and its nitride, but may not necessarily be such a laminated structure, and further, its material may be a metal such as Ti and Al, or ITO.

Then, surfaces of the gate bus line 31 and the storage capacitor bus line 37 are anodized (not illustrated), and an insulating film 34 made of silicon nitride or the like is further deposited thereon. It does not make any difference whether the insulating film 34 may be patterned or not.

Thereafter, a TFT 50 is formed in such a manner that (i) a semiconductor layer is formed by a CVD method, (ii) the semiconductor layer is patterned by a photolithography process, and (iii) an impurity is injected therein so that a channel region of the TFT is formed. A metal film is deposited thereon by sputtering, and the metal film is patterned by a photolithography process so that a source bus line 32 and a drain electrode are formed. A material of the source bus line 32 is a metal such as Ta, Ti, or Al, similarly to the gate bus line 31 and the storage capacitor bus line 37. At the last, an insulting film is provided so as to cover the TFT 50 (not illustrated), thereby preventing diffusion of the impurity to the TFT section and increasing performance of the semiconductor. In this way, the bus lines and the TFT section are formed in the TFT array substrate.

Then, an interlayer insulating film 35 is formed on the bus lines and the TFT 50. The interlayer insulating film 35 is formed by use of a photoresist made of a polymer material as follows. A photoresist is applied to the TFT array substrate by spin coating, and the photoresist is exposed and developed for forming a contact hole on the drain electrode in order that a pixel electrode is electrically conducted with the drain electrode. The photoresist is then cured by burning in an oven at around 180° C., and thus the interlayer insulating film 35 is formed. A film thickness of the cured interlayer insulating film 35 is 2 μm on average. As a material for the photoresist, either of a positive resist and a negative resist may be used. Then, a pixel electrode is formed in such a manner that a metal film is deposited on the interlayer insulating film 35 by sputtering, and the metal film thus deposited is patterned by a photolithography process. A film thickness of the pixel electrode is 140 nm.

The interlayer insulating film 35 is provided between the bus lines and the pixel electrode 33 so that they are sterically spaced. Therefore, the pixel electrode 33 never short-circuits with the bus lines. On this account, when the liquid crystal display panel is viewed from its display surface side, the pixel electrode 33 can be provided so as to overlap a respective of the gate bus line 31 and the source bus line 32 in a plane manner, and a space between each pixel electrode 33 can be arranged to be 5 μm. In this embodiment, the pixel electrode 33 is a transparent electrode made of ITO, but the pixel electrode 33 may be made of a transparent thin-film conducting material such as IZO. In a case of a reflective liquid crystal display device, the pixel electrode 33 may be made of a reflective thin-film conducting material such as Al or Ag instead of ITO.

The following explanation deals with a forming method of a counter substrate. A counter substrate is formed as follows. A black matrix (not illustrated) for dividing each pixel and an RGB color filter (not illustrated) are formed on a glass substrate 40 in a stripe geometry. Then a transparent electrode 41 is formed in such a manner that ITO is sputtered on the glass substrate 40.

Then, a process for aligning a liquid crystal on the TFT array substrate and the counter substrate is carried out. A polyimide for parallel alignment is printed on each of the substrates, and burned in an oven at 200° C. for an hour, so that alignment films 36 and 42 are formed. A film thickness of each of the burned alignment films is around 100 nm. The alignment films are then rubbed with cotton in one direction so that an alignment direction becomes parallel when the TFT array substrate and the counter substrate are bonded with each other. An adequate amount of plastic spacers of 5 μm in diameter are sprayed on the TFT array substrate by a dry method, while a seal is printed on a peripheral region of a screen in the counter substrate. Then the substrates are bonded in place with each other. A thermosetting resin is used as the seal. The substrates thus bonded are then burned in an oven at 170° C. for one and a half hours under pressure. A liquid crystal is injected between the substrates by use of a vacuum injection method. In this way, the liquid crystal display panel of the Embodiment 1 is formed.

Moreover, for the sake of a wide viewing angle, a viewing angle compensation wave plate is provided on either side of the liquid crystal display panel, and a polarization plate is further provided on the either side of the liquid crystal display panel such that absorption axes of the wave plates and the polarization plates are orthogonal to each other.

Figure 3:
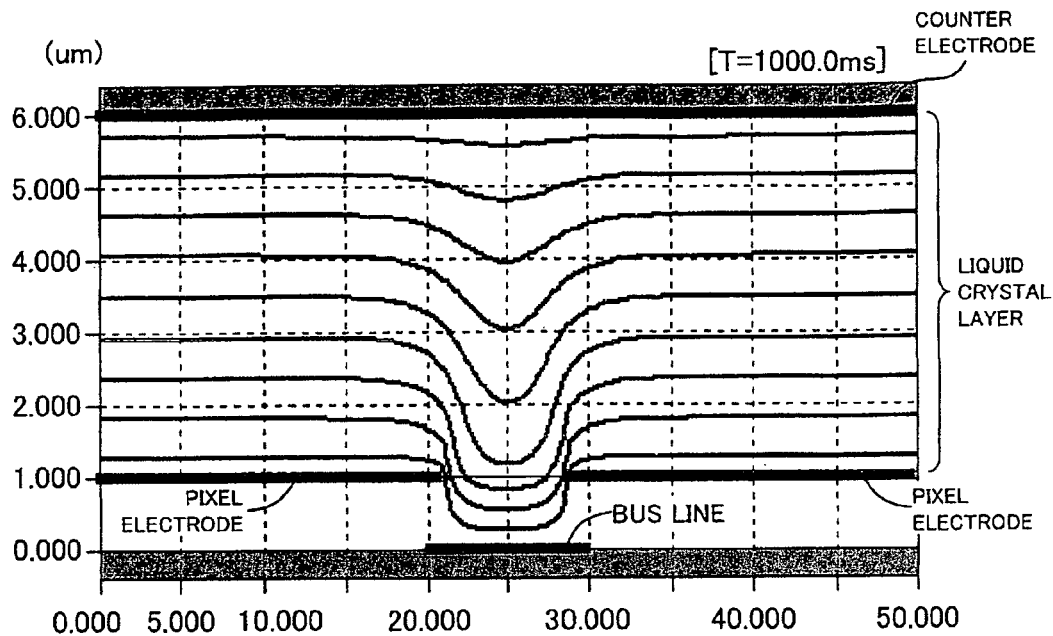
FIG. 3 illustrates a potential state when a voltage is applied to pixel electrodes, bus lines, and a counter electrode in the liquid crystal panel of Embodiment 1.

In a liquid crystal display device having the arrangements of FIGS. 1 and 2, a potential when a voltage was applied to the pixel electrode 33, the bus lines, and the counter electrode 41 was measured. The result is shown in FIG. 3. In the liquid crystal display device, since the pixel electrode 33 was provided so as to overlap the bus lines via the interlayer insulating film 35 in a plane manner, no distanced spaced was provided between the pixel electrode and the bus lines. As a result, as shown in FIG. 3, it is shown that the voltage was sufficiently applied to between each of the pixel electrodes adjoining each other.

Then, an optical characteristic of the liquid crystal display panel thus manufactured by the above method was evaluated. Ten volts were applied to the liquid crystal layer in such a manner that a signal of 0V was supplied from the source bus line to the pixel electrode, and an alternating current rectangular wave of 10V was applied to the counter electrode. After a period of time when the voltages were applied, a splay-to-bend transition spread over an entire screen, and all pixels were changed to a bend alignment. In the other words, in the liquid crystal display panel of Embodiment 1, since the pixel electrode was provided so as to overlap the bus lines in a plane manner, it was observed that the splay-to-bend transition was not only carried out in one pixel, but also spread into adjoining pixels.

In the liquid crystal display panel, since the screen was entirely changed to the bend alignment, a black state was observed from an oblique direction by use of the viewing angle compensation wave plates in combination, thereby realizing a liquid crystal display panel having a wide viewing angle characteristic. Furthermore, even when the voltage was quickly switched between ON and OFF, a rapid response in not more than a few msec was demonstrated. Here, the ON means a comparatively high voltage corresponding to a black display, and the OFF means a comparatively low voltage corresponding to a white display. For example, a voltage of 10V is ON, and a voltage of 2 V is OFF.

Figure 4:
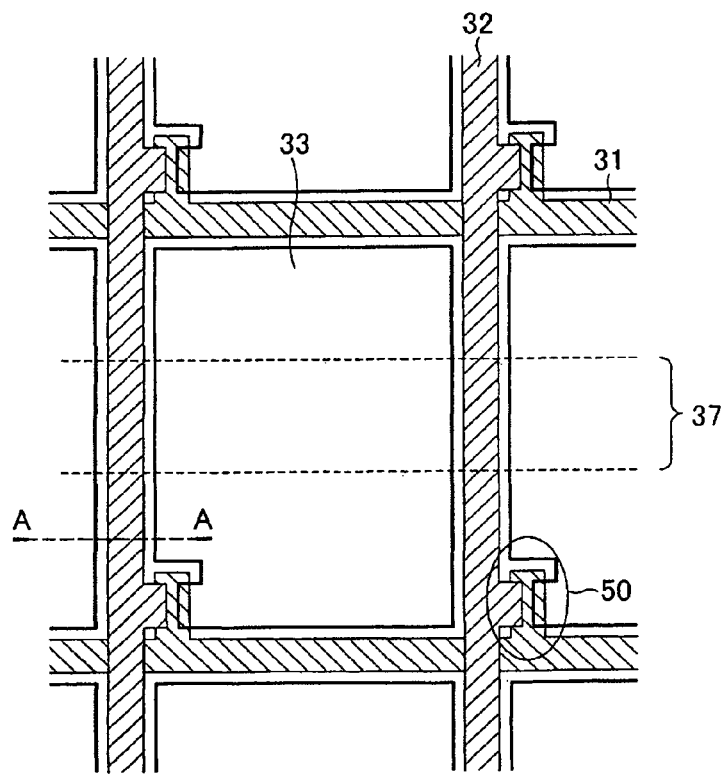
FIG. 4 is a plan view illustrating a pixel arrangement of a conventional liquid crystal panel.
Figure 5:
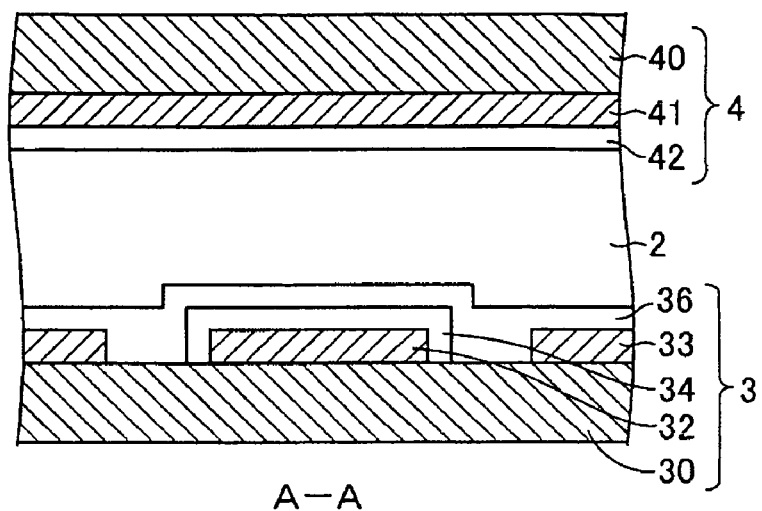
FIG. 5 is a cross sectional view taken along line A-A of FIG. 4.

For comparison, a TFT liquid display panel having a conventional structure in which no interlayer insulating film is provided between bus lines and a pixel electrode was manufactured. FIG. 4 is a plan view illustrating a pixel arrangement of a comparative TFT liquid crystal display panel. FIG. 5 illustrates a cross sectional view take along line A-A of FIG. 4. In FIGS. 4 and 5, constituent members similar to those in FIGS. 1 and 2 have the same referential numerals as those in FIGS. 1 and 2.

In the conventional TFT liquid crystal display panel, since no interlayer insulating film is provided between a pixel electrode 33 and bus lines, the pixel electrode 33 cannot be provided so as to overlap the bus lines in a plane manner. From this reason, for the sake of preventing short-circuit of the pixel electrode 33 with the bus lines, a space is provided so as to be 5 μm between the bus lines and the pixel electrode.

In a similar manner to the above method, a conventional liquid crystal display panel was manufactured, and observed in a state where ten volts were applied to the liquid crystal layer. In the liquid crystal display panel, because a splay-to-bend transition did not spread into adjoining pixels, there remained pixels that were not changed to a bend alignment. As a result, when viewed from an oblique direction, the pixels were observed as bright dots due to a difference of retardation. This may be because the voltage was not sufficiently applied to a part of the liquid crystal layer between the pixel electrode and the bus lines, and the part of the liquid crystal layer disturbed spread of the splay-to-bend transition. Accordingly, it is considered that the liquid crystal could not be changed to the bend alignment at all in pixels having no transition nucleus. These pixels that were not changed to the bend alignment remained during displaying and were never changed to the bend alignment.

EMBODIMENT 2

Embodiment 2 of the present invention is described below with reference to FIGS. 6 and 7.

Figure 6:
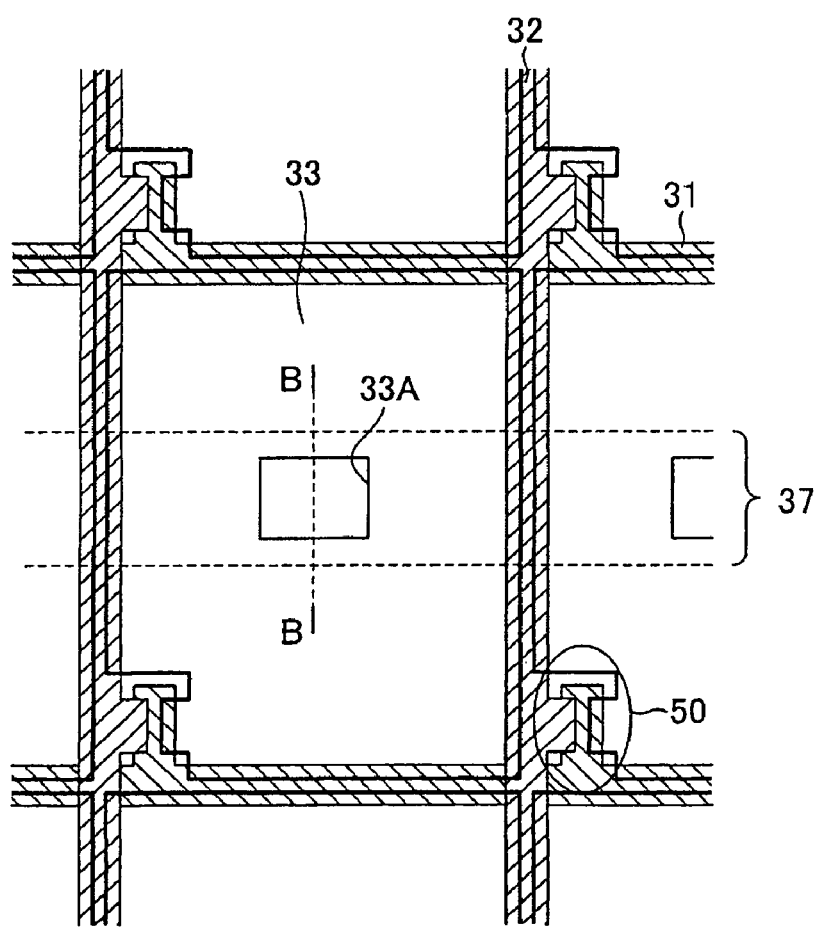
FIG. 6 is a plan view illustrating a pixel arrangement of a liquid crystal display panel of Embodiment 2.
Figure 7:
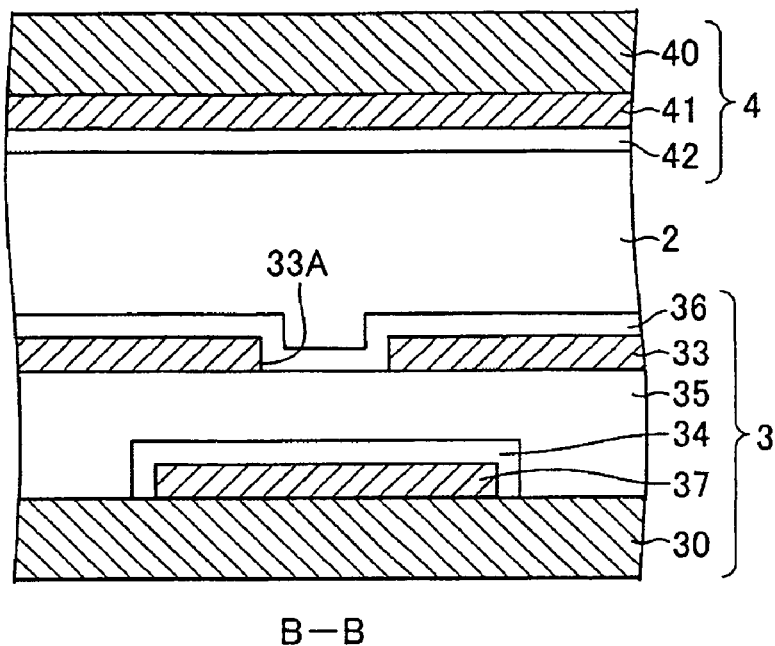
FIG. 7 is a cross sectional view taken along line B-B of FIG. 6.

The following explanation deals with a TFT liquid crystal display panel of Embodiment 2 with reference to FIGS. 6 and 7. FIG. 6 is a plan view schematically illustrating a pixel arrangement of a liquid crystal display panel of Embodiment 2. FIG. 7 is a cross sectional view taken along line A-A of FIG. 6. In FIGS. 6 and 7, constituent members similar to those in FIGS. 1 and 2 have the same referential numerals as those in FIGS. 1 and 2.

A TFT liquid crystal display panel of Embodiment 2 has an arrangement almost similar to the liquid crystal display panel of Embodiment 1, but is different from that of Embodiment 1 in that a pixel electrode 33 includes an opening section 33A at a part of an intersection of a pixel electrode 33 and a storage capacitor bus line 37. The TFT liquid crystal display panel of Embodiment 2 can be manufactured by use of the same materials as the liquid crystal display panel of Embodiment 1.

In the TFT liquid crystal display panel of Embodiment 2, the opening section 33A may be formed when a pixel electrode is patterned by a photolithography process. This makes it possible to manufacture the TFT liquid crystal display panel of Embodiment 2 without any additional processes compared with the case of manufacturing the liquid crystal display panel of Embodiment 1.

An optical characteristic of the liquid crystal panel thus manufactured by the above method was evaluated. Ten volts were applied to a liquid crystal layer in such a manner that a signal of 0V was supplied from a source bus line to a pixel electrode, and an alternating current rectangular wave of 10V was applied to an electrode of a counter substrate. Furthermore, 10V of an alternating current rectangular wave having a polarity opposite to the counter electrode were applied to a storage capacitor bus line. Accordingly, a voltage of 10V or more was applied to the liquid crystal layer between the storage capacitor bus line and the counter electrode, and a voltage of a few volts was applied to between the storage capacitor bus line and the pixel electrode. After a period of time when the voltages were applied, a splay-to-bend transition spread over an entire screen, and all pixels were changed to a bend alignment. A time required for the splay-to-bend alignment was shortened by half compared with Embodiment 1.

This may be because, in the TFT liquid crystal display device of Embodiment 2, the voltage that was greater than usual was applied to between the counter electrode 41 and the storage capacitor bus line, so that more transition nuclei were generated compared with Embodiment 1, thereby causing the splay-to-bend transition rapidly.

Moreover, another possible reason may be as follows. The voltage was applied to between the pixel electrode 33 and the storage capacitor bus line 37 that were provided via a thin interlayer insulating film 35, so that its electrical field promoted changes in liquid crystal molecules and caused transition nuclei to be generated in the liquid crystal layer. As a result, the splay-to-bend transition could be carried out rapidly. That is, the electrical field generated, around the opening section 33A, between the storage capacitor bus line 37 and the pixel electrode 35 is not only in a vertical direction, but also in a lateral direction, i.e., a lateral electrical field that passes through the liquid crystal layer 2 generates between the storage capacitor bus line 37 and the pixel electrode 35. This can cause a twist alignment in the liquid crystal. The twist alignment thus caused, around the opening section 33A, in the liquid crystal can cause the splay-to-bend transition.

Furthermore, it was also observed in the TFT liquid crystal display device of Embodiment 2 that the splay-to-bend transition spread into pixels in which no transition nucleus was generated. This is because the pixel electrode was provided so as to overlap the bus lines in a plane manner. Since a screen was entirely changed to the bend alignment, a black state was observed from an oblique direction by use of viewing angle compensation wave plates in combination, thereby realizing a liquid crystal display panel having a wide viewing angle characteristic. Furthermore, even when the voltage was quickly switched between ON and OFF, a rapid response in not more than a few msec was demonstrated.

EMBODIMENT 3

Figure 8:
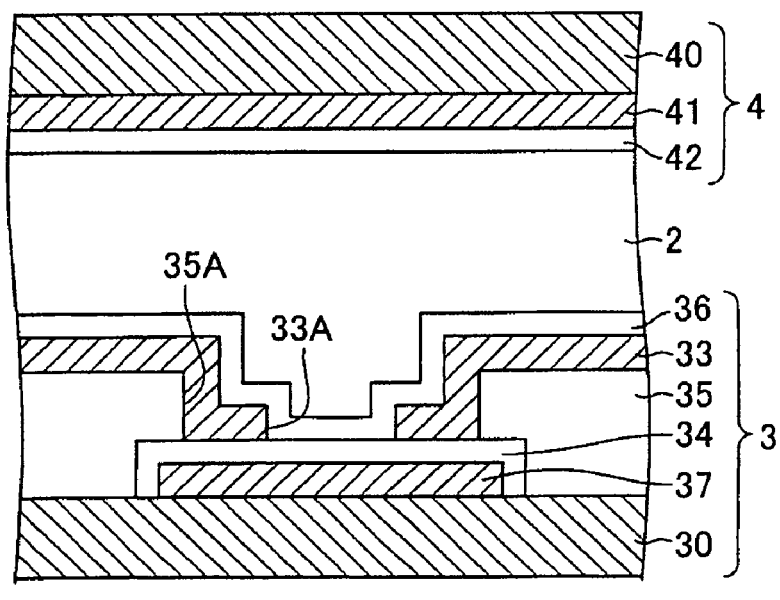
FIG. 8 is a cross sectional view illustrating an arrangement of a liquid crystal display panel of Embodiment 3.

Embodiment 3 of the present invention is described below with reference to FIGS. 8 and 12. The following explanation deals with a TFT liquid crystal display panel of Embodiment 3 with reference to FIG. 8. A planar structure of a pixel of a liquid crystal display panel of Embodiment 3 is the same as that of FIG. 6. FIG. 8 is a cross sectional view taken along line B-B of FIG. 6. In FIG. 8, constituent members similar to those in FIGS. 6 and 7 have the same referential numerals as those in FIGS. 6 and 7.

A TFT liquid crystal display panel of Embodiment 3 has an arrangement almost similar to the liquid crystal display panel of Embodiment 2, but is different from that of Embodiment 2 in that, as illustrated in FIG. 8, an opening section 35A is provided in an interlayer insulating film 35 at a position where an opening section 33A is provided in a pixel electrode 33, the opening section 35 being formed in such a manner that a part of the inter layer insulating film 35 is removed. The opening section 35A in the interlayer insulating film 35 is wider in some degree than the opening section 33A in the pixel electrode 33. The TFT liquid crystal display panel of Embodiment 3 can be manufactured by use of the same materials as the liquid crystal display panels of Embodiments 1 and 2.

In the TFT liquid crystal display panel of Embodiment 3, the opening section 35A can be formed simultaneously in an exposure and development process in which a contact hole is formed in the interlayer insulating film 35 that is formed of a photoresist. This makes it possible to manufacture the liquid crystal display panel of Embodiment 3 without any additional processes compared with the case of manufacturing the liquid crystal display panel of Embodiment 1.

An optical characteristic of the liquid crystal panel thus manufactured by the above method was evaluated. Ten volts were applied to a liquid crystal layer in such a manner that a signal of 0V was supplied from a source bus line to a pixel electrode, and an alternating current rectangular wave of 10V was applied to an electrode of a counter substrate. Furthermore, 100V of an alternating current rectangular wave having a polarity opposite to the counter electrode were applied to a storage capacitor bus line. Thus, a voltage of around 20V was applied to the storage capacitor bus line and the counter electrode, and a voltage of around 10V was applied to the storage capacitor bus line and the pixel electrode. After a period of time when the voltages were applied, a splay-to-bend transition spread over an entire screen, and all pixels were changed to a bend alignment. A time required for the splay-to-bend alignment was shortened by one tenth compared with Embodiment 1.

This may be because, in the TFT liquid crystal display device of Embodiment 3, the voltage greater than usual was applied to between the counter electrode and the storage capacitor bus line, so that more transition nuclei were generated, thereby causing the splay-to-bend transition more rapidly.

Moreover, another possible reason may be as follows. The voltage was applied to between the pixel electrode 33 and the storage capacitor bus line 37 that were provided via a thin gate insulating film 34, so that its electrical field promoted changes in liquid crystal molecules and caused transition nuclei to be generated in the liquid crystal layer. As a result, the splay-to-bend transition could be carried out more rapidly. That is, the electrical field generated, around the opening section 33A, between the storage capacitor bus line 37 and the pixel electrode 35 is not only in a vertical direction, but also in a lateral direction, i.e., a lateral electrical field that passes through the liquid crystal layer 2 generates between the storage capacitor bus line 37 and the pixel electrode 35. This can cause a twist alignment in the liquid crystal. Here, in Embodiment 3, since only the gate insulating film 34 is provided between the pixel electrode 33 and the storage capacitor bus line 37 in the opening section 35A that is formed by removing the interlayer insulating film 35, an intensity of the lateral electrical field is greater than that in Embodiment 2, thereby causing the splay-to-bend alignment more easily.

Furthermore, it was also observed in the TFT liquid crystal display device of Embodiment 3 that the splay-to-bend transition spread into pixels in which no transition nucleus was generated. This is because the pixel electrode was provided so as to overlap the bus lines in a plane manner. Since a screen was entirely changed to the bend alignment, a black state was observed from an oblique direction by use of viewing angle compensation wave plates in combination, thereby realizing a liquid crystal display panel having a wide viewing angle characteristic. Furthermore, even when the voltage was quickly switched between ON and OFF, a rapid response in not more than a few msec was demonstrated.

In the liquid crystal display panel of Embodiment 3, it is also possible to form the gate insulating film 34 and the interlayer insulating film 35 at the same time instead of forming them separately. In this case, if no insulating film is provided in a lacking section (corresponding to the opening section 35A of FIG. 8) provided at an intersection of the storage capacitor bus line 37 and the pixel electrode 33, the upper and lower electrodes are electrically conducted with each other. From this reason, it is necessary to provide an insulating film in the lacking section. A method for providing an insulating film in the lacking section encompasses (1) a method in which an insulating film is formed of a material using a resist, and an exposure process is not fully carried out (half exposure), and (2) a method in which etching of an insulating film is ceased in the middle of the process. These methods are known as methods that are difficult to be repeated or controlled, but if these methods are possible, then it is advantageously possible to shorten a process for forming an insulating film.

In each of the liquid crystal display panels described in Embodiments 1 through 3, the pixel electrode 33 is arranged such that a periphery of the pixel electrode 33 almost entirely overlaps the bus lines in a plane manner. Even in a case where a periphery of the pixel electrode 33, only in part, overlaps the bus lines in a plane manner, as illustrated in FIGS. 9 through 11, it is also possible to obtain an advantageous effect.

Figure 9:
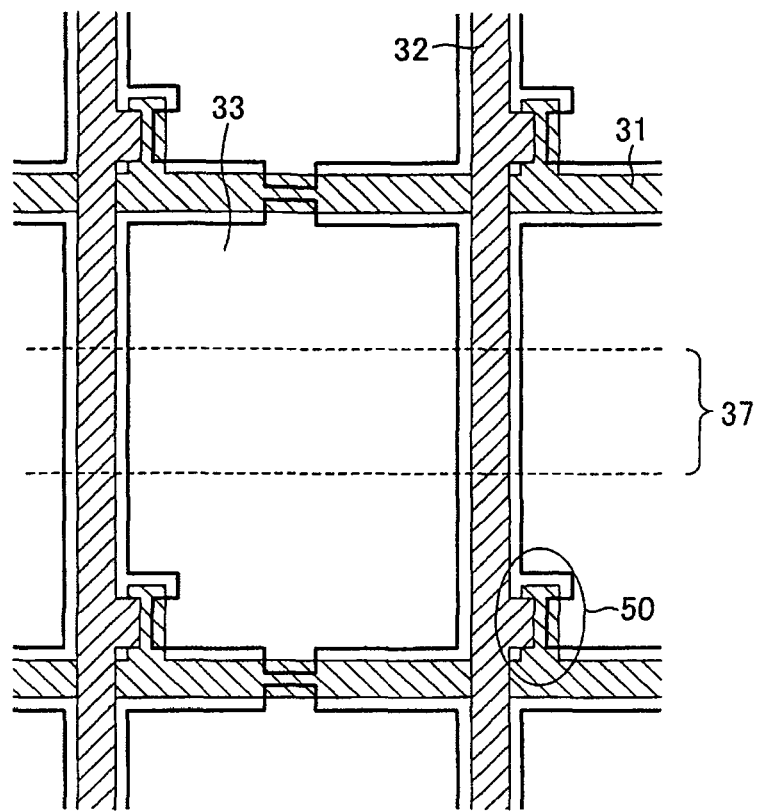
FIG. 9 is a plan view illustrating a pixel arrangement of a liquid crystal display panel as a modification example of the present invention.
Figure 10:
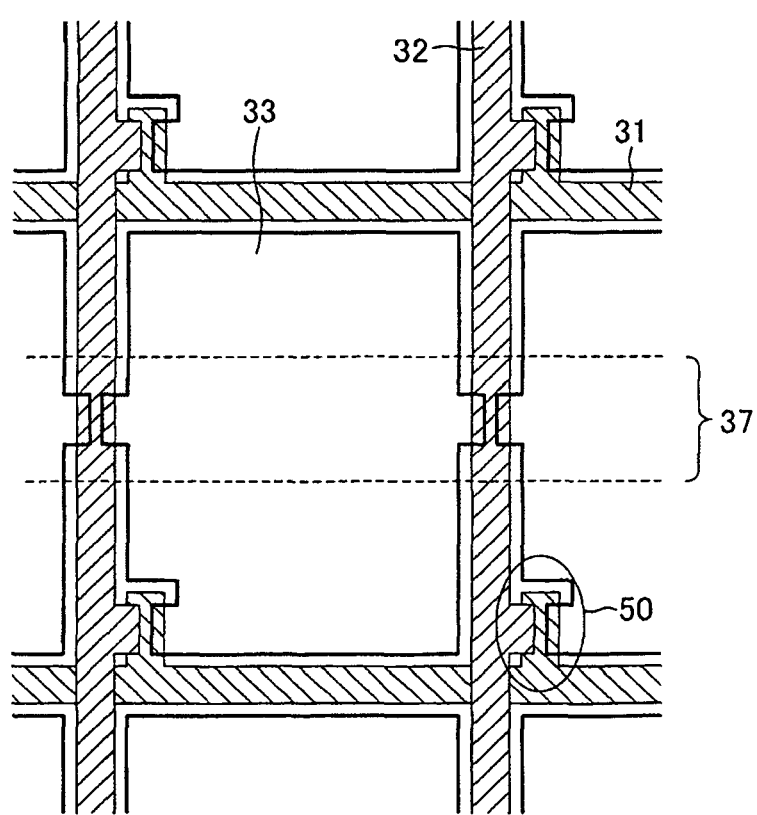
FIG. 10 is a plan view illustrating a pixel arrangement of a liquid crystal display panel as a modification example of the present invention.
Figure 11:
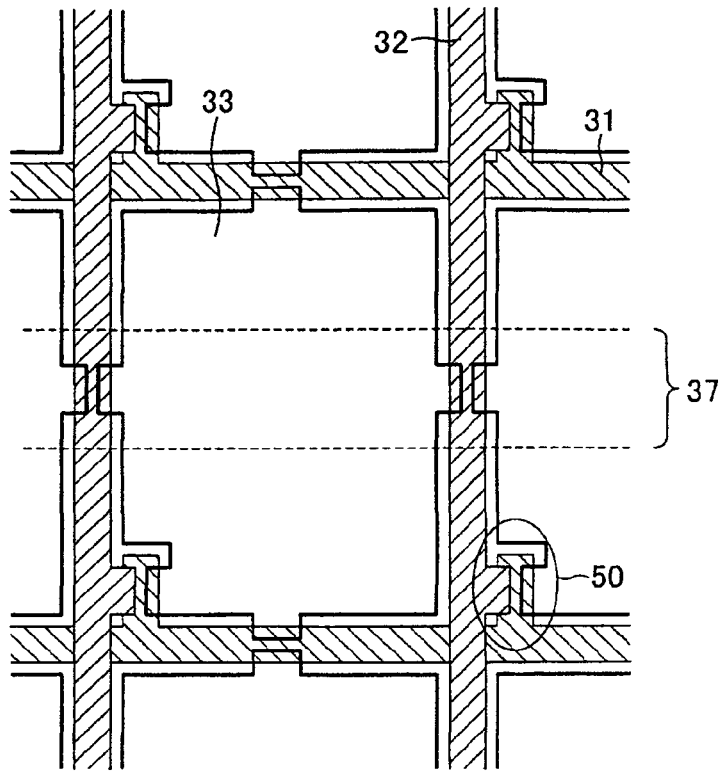
FIG. 11 is a plan view illustrating a pixel arrangement of a liquid crystal display panel as a modification example of the present invention.

For example, in arrangements of FIGS. 9 and 10, since a splay-to-bend transition surely spreads in a vertical or lateral direction, it is not necessary that transition nuclei be generated in all pixels. However, it is further preferable to ensure the splay-to-bend transit spreads in four directions. On this account, it is preferable that four sides of the pixel electrode 33 respectively overlap, in part, the bus lines in a plane manner as illustrated in FIG. 11.

Figure 12:
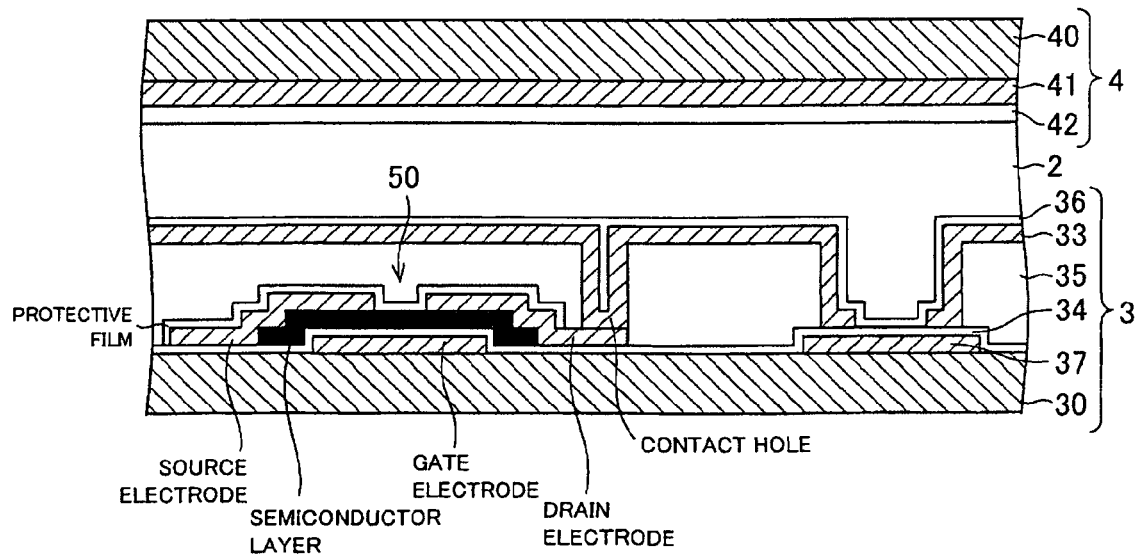
FIG. 12 is a cross sectional view illustrating an exemplary position of a contact hole in the liquid crystal display panel of Embodiment 3.
Figure 13:
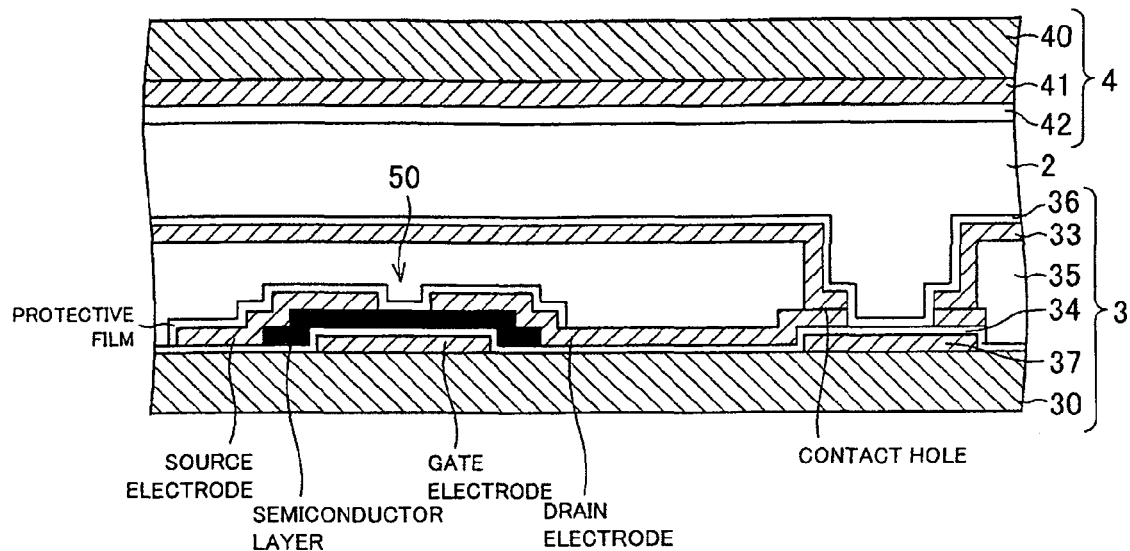
FIG. 13 is a cross sectional view illustrating another exemplary position of a contact hole in the liquid crystal display panel of Embodiment 3.
Figure 14:
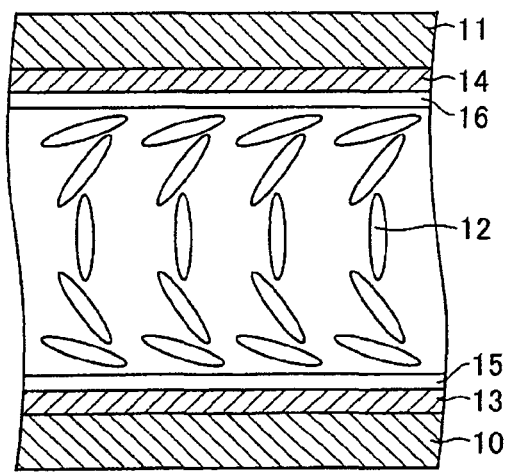
FIG. 14 is a cross sectional view illustrating a liquid crystal layer whose alignment is a bend alignment, in a liquid crystal display device to which an OCB mode is applied.
Figure 15:
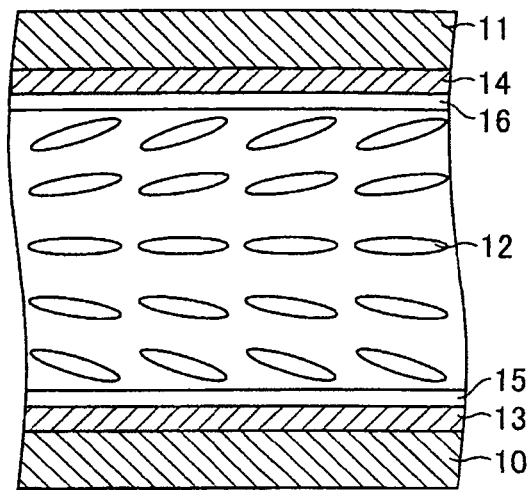
FIG. 15 is a cross sectional view illustrating the liquid crystal layer whose alignment is a splay alignment, in the liquid crystal display device to which the OCB mode is applied.
Figure 16:
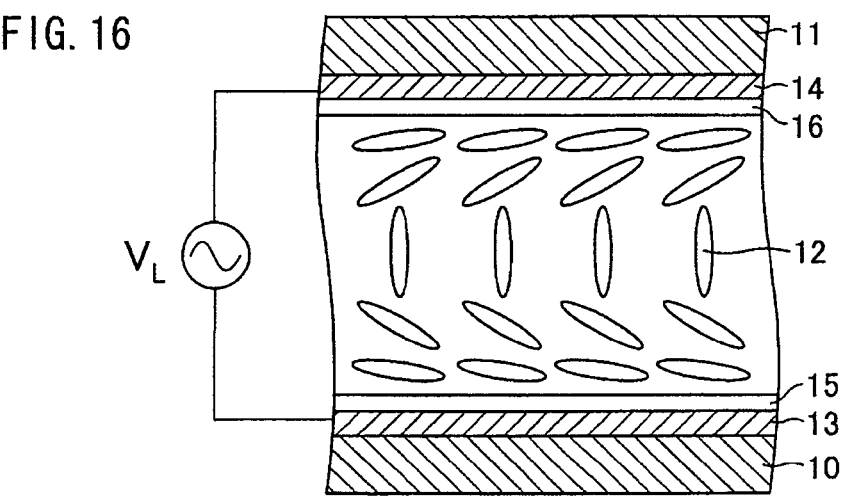
FIG. 16 is a cross sectional view illustrating an exemplary alignment of a liquid crystal during a white display.
Figure 17:
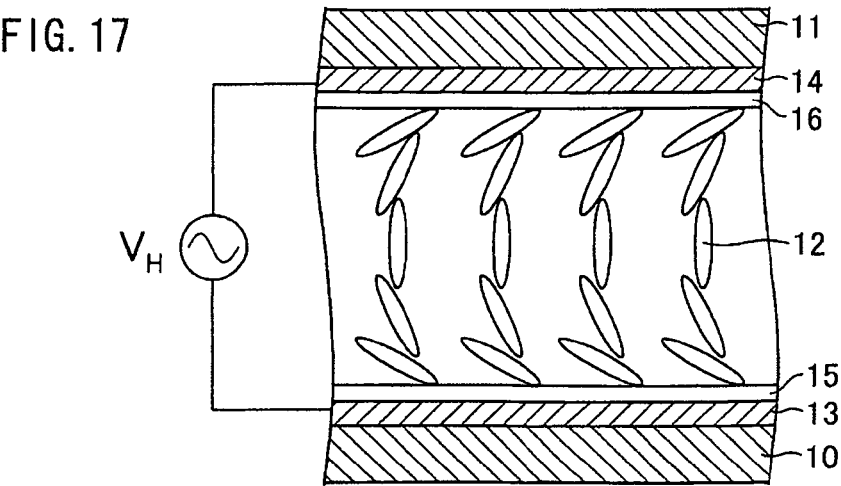
FIG. 17 is a cross sectional view illustrating an exemplary alignment of a liquid crystal during a black display.
Figure 18:
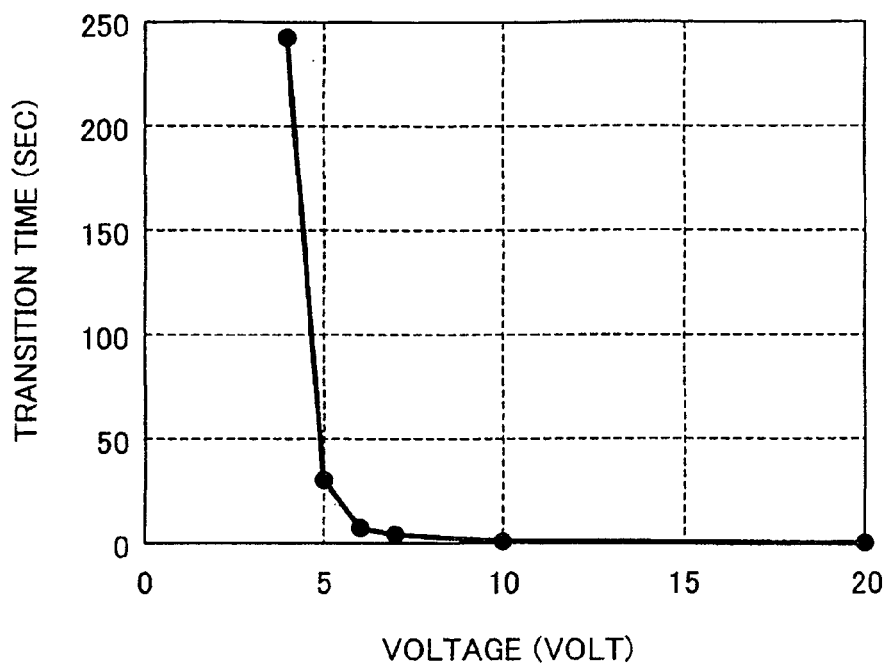
FIG. 18 is a graph illustrating how a voltage applied to a liquid crystal layer at room temperature affects a transition time required for a splay-to-bend transition.
Figure 19:
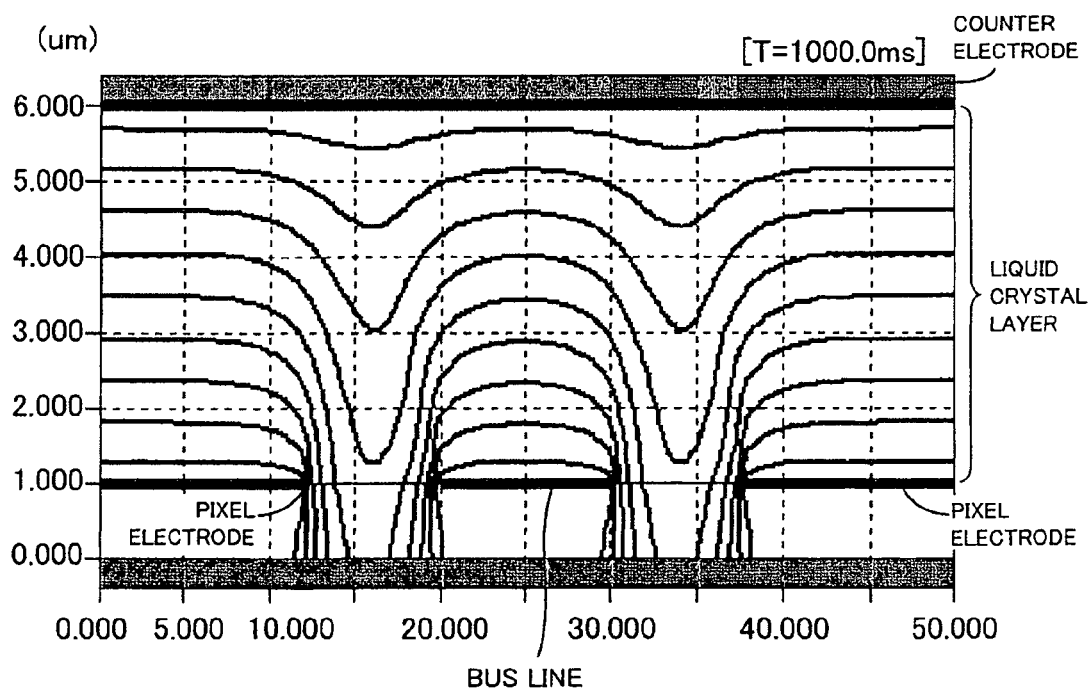
FIG. 19 illustrates a potential state when a voltage is applied to pixel electrodes, bus lines, and a counter electrode in a conventional liquid crystal display panel.

Moreover, in the aforementioned liquid crystal display panel of Embodiment 3, a contact hole for connecting the pixel electrode 33 to a drain electrode of a TFT 50 is generally provided close to the drain electrode, as illustrated in FIG. 12. However, it is also possible, as illustrated in FIG. 13, to use a part where the interlayer insulating film 35 is removed at the intersection of the storage capacitor bus line 37 and the pixel electrode 33 as the contact hole to the drain electrode. In this case, since the contact hole is not required to be formed at a different position, it is possible to increase an aperture ratio of the pixel. With the arrangement in FIG. 13, the aperture ratio is increased, so that a transmittance of the panel is improved and consequently an amount of backlight can be restrained. This makes it possible to realize a liquid crystal display panel with low power consumption.

Furthermore, a liquid crystal display device is realized in such a manner that a driving circuit, a backlight (light source), or the like is provided to the liquid crystal display panel in accordance with Embodiments 1 through 3.

As described above, a liquid crystal display panel of the present invention includes an active matrix substrate including a pixel electrode, a gate bus line, and a source bus line, and a counter substrate are provided so as to face the active matrix substrate via a liquid crystal layer whose alignment is changed from an initial state to an image display state having an alignment different from the initial state, an interlayer insulating layer being provided so as to insulate the pixel electrode from the gate bus line and the source bus line, and the pixel electrode being provided such that the pixel electrode, the gate bus line, and the source bus line overlap each other in a plane manner, when viewed from a display surface side of the liquid crystal display panel.

Here, the liquid crystal layer whose alignment is changed from an initial state to an image display state having an alignment different from the initial state encompasses a liquid crystal layer in the OCB mode which is changed from a splay alignment (the initial state) to a bend alignment (the image display state) while a power of the liquid crystal display device is ON. In such a liquid crystal layer, its alignment is changed from the initial state to the image display state when a voltage is applied to the liquid crystal layer. At this time, an alignment transition occurs from transition nuclei and spreads over a screen, with the result that the alignment transition is carried out over the entire screen.

In the arrangement, the interlayer insulating layer is provided so as to insulate the pixel electrode from the gate bus line and the source bus line. While maintaining its insulation property, the pixel electrode is provided such that the pixel electrode, the gate bus line, and the source bus line, at least in part, overlap each other in a plane manner, when viewed from the display surface side.

With the arrangement, when the voltage is applied to the liquid crystal layer, a voltage-applied area can be continued between adjoining pixel electrodes in a part where the pixel electrode overlaps the bus lines in a plane manner. As a result, an alignment transition that has occurred in a certain pixel can spread into its adjoining pixels, and also spread into pixels in which no transition nucleus is generated. This allows the entire screen to be changed to the image display state.

Moreover, the liquid crystal display panel can be further include: a storage capacitor bus line so that the interlayer insulating layer is provided between the pixel electrode and the storage capacitor bus line; and an opening section being provided partially the pixel electrode in a region where the pixel electrode and the storage capacitor bus line are intersected with each other.

With the arrangement, a lateral electrical field is generated, around the opening section, between the storage capacitor bus line and the pixel electrode, and the lateral electrical field causes a twist alignment in a liquid crystal. This causes transition nuclei to be generated in many pixels, with the result that a rapid alignment transition from the initial state to the image display state is attained in the liquid crystal layer.

Furthermore, the liquid crystal display panel can be arranged such that the interlayer insulating film provided around the opening section has a film thickness thinner than that in other region.

With the arrangement, the lateral electrical field generated around the opening section becomes large, thereby resulting in that the alignment transition from the initial state to the image display state can be carried out more rapidly in the liquid crystal layer.

The liquid crystal display panel can be arranged such that the liquid crystal layer is a liquid crystal layer in an OCB mode.

The liquid crystal display panel can be arranged such that the pixel electrode is a transparent electrode.

The invention claimed is:

1. A liquid crystal display panel, comprising:
   an active matrix substrate including a pixel electrode, a gate bus line, and a source bus line;
   a counter substrate provided so as to face the active matrix substrate via a liquid crystal layer whose alignment is changed from an initial state to an image display state having an alignment different from the initial state; and
   an interlayer insulating film provided so as to insulate the pixel electrode from the gate bus line and the source bus line,
   the pixel electrode being provided such that the pixel electrode, the gate bus line, and the source bus line, at least in part, overlap each other in a plane manner, when viewed from a display surface side of the liquid crystal display panel an opening section being provided partially in the pixel electrode in a region where the pixel electrode and the storage capacitor bus line are intersected with each other.

2. The liquid crystal display panel as set forth in claim 1, further comprising:
   a storage capacitor bus line provided so that the interlayer insulating film ha-y~ is provided between the pixel electrode and the storage capacitor bus line.

3. The liquid crystal display panel as set forth in claim 2, wherein:
   the interlayer insulating film provided around the opening section has a film thickness thinner than that in other region.

4. The liquid crystal display panel as set forth in claim 1, wherein:
   the liquid crystal layer is a liquid crystal layer in an OCB mode.

5. The liquid crystal display panel as set forth in claim 1, wherein:
   the pixel electrode is a transparent electrode.

6. A liquid crystal display device comprising a liquid crystal display panel as set forth in claim 1.

* * * * *